(12) United States Patent
Waide et al.

(10) Patent No.: US 7,866,598 B2
(45) Date of Patent: Jan. 11, 2011

(54) ROTORCRAFT ENGINE AND ROTOR SPEED SYNCHRONIZATION

(75) Inventors: William Martin Waide, Wrightwood, CA (US); Abe Karem, N. Tustin, CA (US)

(73) Assignee: Karem Aircraft, Inc., Lake Forest, CA (US)

( * ) Notice: Subject to any disclaimer, the term of this patent is extended or adjusted under 35 U.S.C. 154(b) by 0 days.

(21) Appl. No.: 12/399,291

(22) Filed: Mar. 6, 2009

(65) Prior Publication Data

US 2009/0224096 A1  Sep. 10, 2009

Related U.S. Application Data

(60) Provisional application No. 61/034,457, filed on Mar. 6, 2008.

(51) Int. Cl.
*B64C 27/28* (2006.01)

(52) U.S. Cl. .................. 244/7 R; 244/17.23; 244/56; 74/333; 192/48.5

(58) Field of Classification Search .......... 244/7 R, 244/8, 221, 231, 17.23; 74/331, 665 F, 665 G, 74/665 GA, 333; 192/48.5, 48.6, 48.9, 69.82
See application file for complete search history.

(56) References Cited

U.S. PATENT DOCUMENTS

| | | | | | |
|---|---|---|---|---|---|
| 2,441,920 | A | * | 5/1948 | Platt ........................ | 244/17.13 |
| 2,651,480 | A | * | 9/1953 | Pullin ...................... | 244/17.23 |
| 3,106,369 | A | * | 10/1963 | Borst ......................... | 244/7 R |
| 3,354,745 | A | * | 11/1967 | De Coye De Castelet ..... | 74/665 GA |
| 3,478,851 | A | * | 11/1969 | Smyth et al. ................ | 192/3.55 |
| 4,059,247 | A | * | 11/1977 | Prewitt ....................... | 244/7 R |
| 4,440,037 | A | * | 4/1984 | Foxton et al. ................. | 74/331 |
| 4,693,129 | A | * | 9/1987 | Pierce .......................... | 74/333 |
| 5,030,179 | A | | 7/1991 | Ganoung | |
| 5,054,716 | A | * | 10/1991 | Wilson ....................... | 244/56 |
| 5,823,470 | A | * | 10/1998 | Craig et al. .................. | 244/7 R |
| 6,260,793 | B1 | * | 7/2001 | Balayn et al. ............... | 244/7 R |
| 6,276,633 | B1 | * | 8/2001 | Balayn et al. ................. | 244/56 |
| 6,367,736 | B1 | * | 4/2002 | Pancotti ....................... | 244/7 R |
| 6,371,882 | B1 | | 4/2002 | Casey et al. | |
| 6,397,994 | B1 | * | 6/2002 | Bowen ....................... | 192/48.9 |
| 6,607,161 | B1 | * | 8/2003 | Krysinski et al. .......... | 244/7 A |
| 6,641,365 | B2 | | 11/2003 | Karem | |
| 7,077,024 | B2 | * | 7/2006 | Lauri et al. ................... | 74/325 |
| 7,083,545 | B2 | * | 8/2006 | Ibamoto et al. ............... | 477/5 |
| 2001/0017061 | A1 | * | 8/2001 | Friel .......................... | 74/375 |
| 2002/0088288 | A1 | * | 7/2002 | Bowen ........................ | 74/331 |
| 2002/0088289 | A1 | * | 7/2002 | Bowen ........................ | 74/331 |
| 2004/0055403 | A1 | * | 3/2004 | Ikeda .......................... | 74/333 |

(Continued)

Primary Examiner—Benjamin P Lee
(74) Attorney, Agent, or Firm—Fish & Associates, PC (57) ABSTRACT

Systems and methods are provided in which an electrical control system independently effects acceleration of both driven and driving elements of a clutch to engage each other. In preferred embodiments the clutch is not a friction clutch, but a dog clutch, and forms part of a drive drain of a rotorcraft. A second clutch can be used, along with a mechanical interlock to prevent simultaneous engagement of the clutches. Speeds of the driven and driving elements can be sensed, and altered using at least one of a rotor, a brake, a generator, an electric motor, and a combustion motor. In rotorcraft embodiments, the gearbox can have a neutral condition in which no power is transmitted from the engine to the rotor

14 Claims, 8 Drawing Sheets

U.S. PATENT DOCUMENTS

| | | | |
|---|---|---|---|
| 2004/0144190 A1* | 7/2004 | Hall, III | 74/331 |
| 2005/0045762 A1 | 3/2005 | Pham | |
| 2007/0205321 A1* | 9/2007 | Waide | 244/17.23 |
| 2007/0219044 A1* | 9/2007 | Waide | 475/336 |
| 2008/0000311 A1* | 1/2008 | Baldwin | 74/331 |

* cited by examiner

ROTORCRAFT ENGINE AND ROTOR SPEED SYNCHRONIZATION

This application claims priority to U.S. provisional application Ser. No. 61/034,457, filed Mar. 6, 2008, the disclosure of which is incorporated herein by reference in its entirety.

FILED OF THE INVENTION

The field of the invention is drive trains, and especially drive trains of rotorcraft.

BACKGROUND

It is common practice for prior art tiltrotor aircraft to have first and second rotors, each disposed in a first and second tilting nacelle. It is further well accepted to mechanically drive the first rotor from a first engine mounted within a first tilting nacelle, and to configure the drive as a reduction gearbox driving the first rotor from the first engine. Alternative engine locations outside the nacelle have been also been proposed in the prior art.

It is also common practice to mechanically connect a first rotor to the second rotor laterally across the wing of the aircraft by means of shafting, called cross-wing drive shafting. The purpose of the cross-wing drive connection is to assure power availability to both rotors in the event of the failure of one engine. This feature helps enable one engine inoperative (OEI) helicopter mode flight, and is a fundamental redundancy feature of tiltrotor aircraft. As for any aircraft component, an extremely reliable and light weight system is desired.

A typical flight operation sequence for a tiltrotor aircraft is to take off vertically with nacelles and rotors oriented largely vertically, accelerate to some forward speed using a cyclic pitch command to the rotors mixed with partial tilt of nacelles and rotors. Subsequently, nacelles are tilted further forward until the aircraft adopts an attitude in which the fuselage axis and nacelle axis are generally at the same angle as the flight trajectory. If this action continues progressively and rotation of the rotor axes to the horizontal is accompanied by vehicle acceleration, the lift force required to keep the aircraft in flight will gradually transition from the rotors to the wings, and the rotors will function as propellers when horizontal. As used herein the term "acceleration" includes all changes in momentum with respect to time, including both increases and decreases in velocity.

The rotor of a tilt-rotor aircraft is subject to distinctly different thrust requirements in vertical, helicopter-mode flight and in cruise airplane-mode operation. The same rotor provides both lift and thrust to the airframe in helicopter and cruise modes, respectively. To achieve high efficiency in both regimes, it is desirable to vary the speed of the rotor. The concept and implementation of an optimally variable speed rotor is described in U.S. Pat. No. 6,641,365 to Karem. This and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

Aircraft engines, and especially turboshaft engines, provide more power and higher efficiency (in the form of lower fuel consumption) at higher engine rotational speed as opposed to lower engine rotational speed. Engine rotational speed is often measured in rotations per minute, or RPM. Reduction of rotor rotational speed and maintaining engine rotational speed is possible through a transmission gear shift providing two or more gear ratios. The reason for a variable gear ratio is that the range of output shaft speed delivered by current turboshaft engine is not sufficient to meet the speed range required by the rotors. Turboshaft engine output speed is limited by efficiency, engine stall, and other engine operational margins. In such a situation, a gearbox with two or more discrete gear ratios can be highly beneficial. A notable prior art example of changing the gear ratio between the engine and the rotors in a tiltrotor aircraft can be found in the 1950s era Bell™ XV-3 experimental aircraft. In this example, the coordination of engine speed, rotor speed, and the manipulation of the clutch and of the gearshifter was all accomplished manually and with some difficulty by the pilot. Furthermore, a heavy friction clutch was used in the Bell™ XV-3 to allow the operator a wide margin in matching engine and rotor speeds in either gear ratio. This system had poor reliability, a large weight penalty, no automation, and scaled poorly to larger sized aircraft. Consequently, aircraft subsequent to the Bell™ XV-3 have avoided the use of shifting gearboxes.

Thus there is still a need for systems and method that provide high thrust for vertical takeoff and high efficiency for forward flight in rotorcraft, especially tiltrotor aircraft.

SUMMARY OF THE INVENTION

The present invention provides systems, methods, and apparatus for high reliability, low weight, power transmission with shifting between multiple fixed gear ratios via synchronizing the driving and driven elements around a speed change mechanism. In preferred embodiments, the speed change mechanism is a dog clutch and an electrical control system coupled to a motive source, including for example a rotor, power generator, or variable speed electrical motor that accelerates driving and/or driven elements of the dog clutch. By use of a dog clutch as a speed change mechanism, any reliance on a frictional coupling is avoided.

There is special applicability to tiltrotor aircraft which can benefit greatly from having the feature of a variable gear ratio between the engines and rotors. In that environment, highly reliable multiple-speed ratio-changing gearboxes provide high rotor speeds for efficient helicopter mode flight, and low rotor speeds for efficient propeller mode flight. Gearboxes of two, three, or more output ratios (speeds) are contemplated. In especially preferred embodiments, the speed changing system consists of multiple redundant mechanical and electromechanical components, comprising gears, clutches, actuators and electrical generators/motors. Additionally, mechanisms may be located in the rotor drive reduction gearbox and positioned between the engine or engines and the final reduction gears driving the rotor.

It is contemplated that driving and driven elements can be synchronized without necessarily relying on control of a rotor or other high inertia load, thereby increasing the speed of the shifting process. Instead, driving and driven elements can advantageously be synchronized with a low inertia, high response rate loop comprising a motor driving the driving element. Driving and driven elements can be engaged by means of an electrically operated actuator.

In preferred embodiments, driving and driven elements are intermediate components of a gearbox to which they are torsionally coupled. It is contemplated that the gearbox could have at least high and low speed gears mechanically coupled to other elements of the gearbox, including for example the dog clutch. An electrical control system is advantageously included to control a motive source to accelerate at least one of the driving and driven elements to closely match a speed of the other within one percent.

Some preferred embodiments utilize a sprag or other over-running clutch that accommodates over-running output of the engine, and quick speed synchronization. Such systems are advantageously configured to have an operating frequency of at least 1, 5, 10, 100, or 1000 Hertz.

It is contemplated that the present inventive subject matter can be used for high speed control of a load placed upon the driven element to reduce rotational oscillation of a load placed upon a gearbox. In the case of a rotorcraft, such a load might comprise a plurality of rotor blades, which could advantageously be controlled by Individual Blade Control (IBC).

For some applications, including for example tiltrotor aircraft, a second control system could advantageously be included that controls a second motive source and a second actuator redundantly with the first control system.

In preferred embodiments, the gearbox is equipped with a neutral condition in which no power is transmitted to facilitate shifting. In especially preferred embodiments, the gearbox comprises a second dog clutch and a mechanical interlock that prevents simultaneous engagement of the first and second dog clutches. This interlock can advantageously be configured to allow either one of a first or second actuator to perform the engagement function between driving and driven elements of a speed change mechanism.

Various objects, features, aspects and advantages of the inventive subject matter will become more apparent from the following detailed description of preferred embodiments, along with the accompanying drawing figures in which like numerals represent like components.

DETAILED DESCRIPTION OF THE INVENTION

Figure 1:
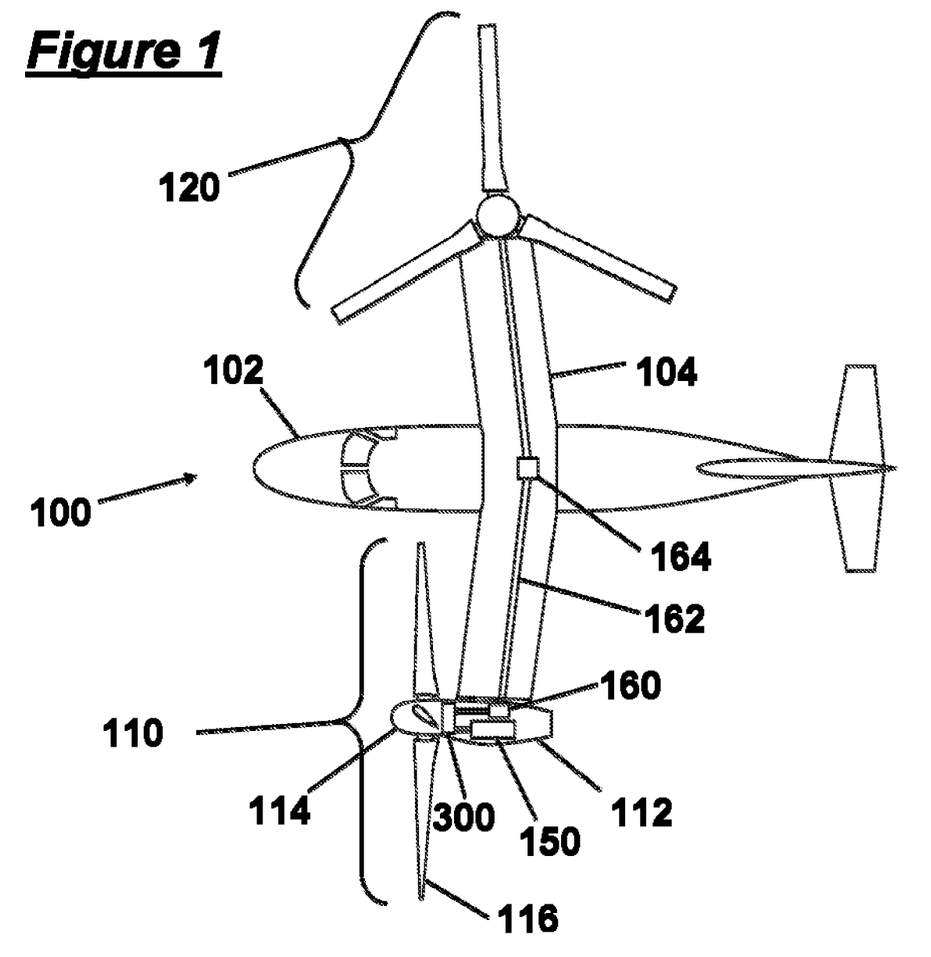
FIG. 1 is a schematic representation of a preferred tiltrotor aircraft.

FIG. 1 is a top view schematic of a preferred tiltrotor aircraft 100. The aircraft comprises a fuselage 102, wing 104, first rotor system 110, and second rotor system 120. The second rotor system 120 is shown in a vertical orientation, consistent with helicopter-mode flight. The first rotor system 110 is shown in a horizontal orientation, consistent with airplane-mode cruise flight. In practice, the first rotor system 110 and second rotor system 120 are likely to have a substantially similar orientation at any given time in flight. A rotor system 110 comprises a hub 114 coupled to a tilting nacelle 112, which tilts with respect to the wing 104. A rotor blade 116 is coupled to the rotor hub 114. An engine 150 is preferably disposed within the tilting nacelle 112 and is coupled to a shifting gearbox 300. A miter gearbox 160 is also coupled to the shifting gearbox 300 as well as to a cross-wing driveshaft 162. The cross-wing driveshaft 162 is preferably disposed within the wing 104 and distal ends of the cross-wing driveshaft 162 are preferably coupled by a mid-wing gearbox 164. The cross-wing driveshaft 162 serves to transmit power from an engine 150 in a first tilting nacelle 112 to a rotor system 120 on the opposite side of the aircraft 100.

Contemplated systems can comprise an engine or engines driving a first-reduction, multiple-output set of gearing whereby the engine drive is first transmitted through a sprag, overrunning or other one-way clutch. Such clutches allow the rotor to over-run the engine, thus a slow-running or failed engine which is not rotating will not affect the rotations of the gearbox or rotor. The multiple output gearing consists of two or more outputs whose speed difference or ratio is the rotor speed ratio desired between the rotor in helicopter mode and the rotor in cruise mode. In some preferred embodiments, two other outputs each drive an electrical generator, so designed as to be able to operate as a variable-speed electric motor when purposely driven and controlled.

Figure 2:
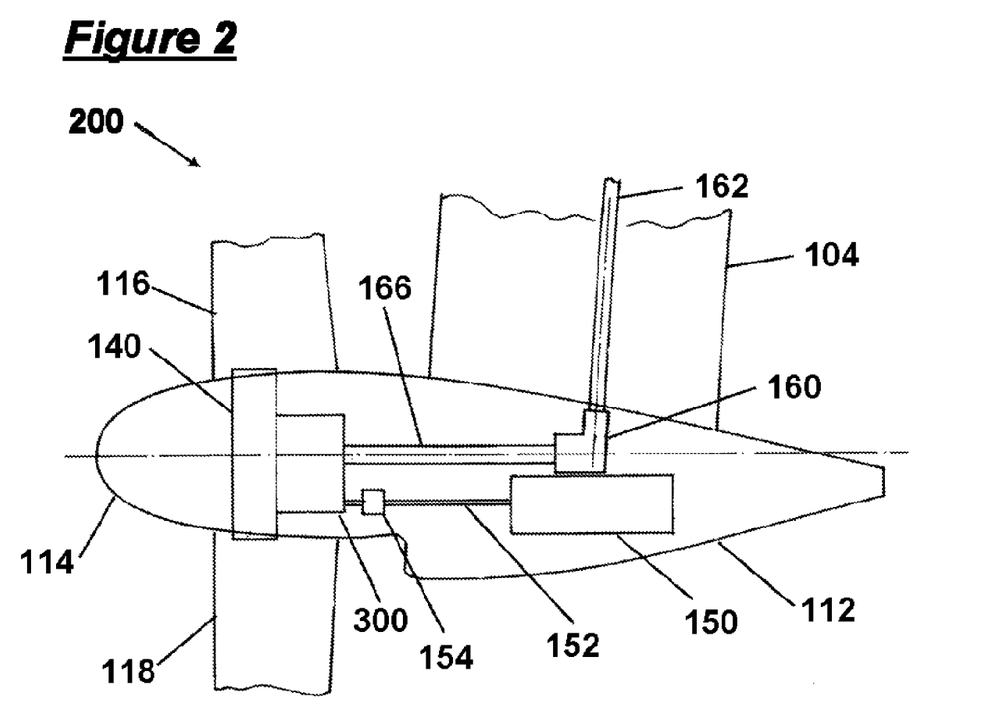
FIG. 2 is a schematic of the gear drive components of one tilting nacelle.

FIG. 2 is an enlarged schematic view of a preferred tilting propulsion system 200. As before, rotor blades 116, 118 are coupled to a rotor hub 114, driven by a reduction gearbox 140, preferably of high but fixed output ratio. Especially preferred reduction would be those described in U.S. provisional patent Ser. No. 61/034,462 filed Mar. 6, 2008, and in U.S. patent pending Ser. No. 11/473,969 filed Jun. 23, 2006. Reduction ratios of the reduction gearbox could be any suitable value, but reduction ratios in the range of 20-40 are especially preferred. Unless the context dictates the contrary, all ranges set forth herein should be interpreted as being inclusive of their endpoints. Similarly, all lists of values should be considered as inclusive of intermediate values unless the context indicates the contrary.

In preferred embodiments, the reduction gearbox 140 is driven by a shifting gearbox 300. The shifting gearbox is preferably capable of providing one of a multiple fixed output ratios. Any suitable number of output ratios or speeds is contemplated, but two speeds are especially preferred for tiltrotor applications. The shifting factor is defined as the result of dividing a higher fixed output ratio by a lower fixed output ratio. The shifting factor is thus the ratio between speeds in a multi-speed gearbox. One skilled in the art will appreciate that the shifting factor for a two-speed gearbox is the result of internal gear arrangement in the shifting gearbox 140. All suitable shifting factors are contemplated, but especially preferred embodiments would have a shifting factor between 1.5 and 2.0. Thus, the output ratio of the shifting gearbox 300 would be selectable from a set number of speeds. Any suitable set of output ratios is contemplated, but values in the range from 1 to 5 are especially preferred.

The shifting gearbox 300 is coupled to an engine 150 via an engine shaft 152 and over-running clutch 154. The shifting gearbox 300 is also coupled to a miter gearbox 160 which connects to a cross-wing driveshaft 162 disposed within the wing 104. It is contemplated that the pitch of rotor blades 116, 118 can be controlled individually by actuators preferably disposed within the rotor hub 114, hereafter referred to as by Individual Blade Control (IBC). The rotor speed and thus shifting gearbox 300 output speed can be adjusted by commanding pitch changes to rotor blades 116, 118 and thus affecting rotor blade 116, 118 lift and drag and thereby load on the driven element of the shifting gearbox 300. This contemplated method comprises high speed control of a load placed upon the driven element to reduce rotational oscillation of a load placed upon a gearbox. The rotor load is considered a high inertia load. If pitch is controlled at high frequency, it is contemplated that blade pitch could be used to reduce rotational oscillation of the drive train.

Figure 3:
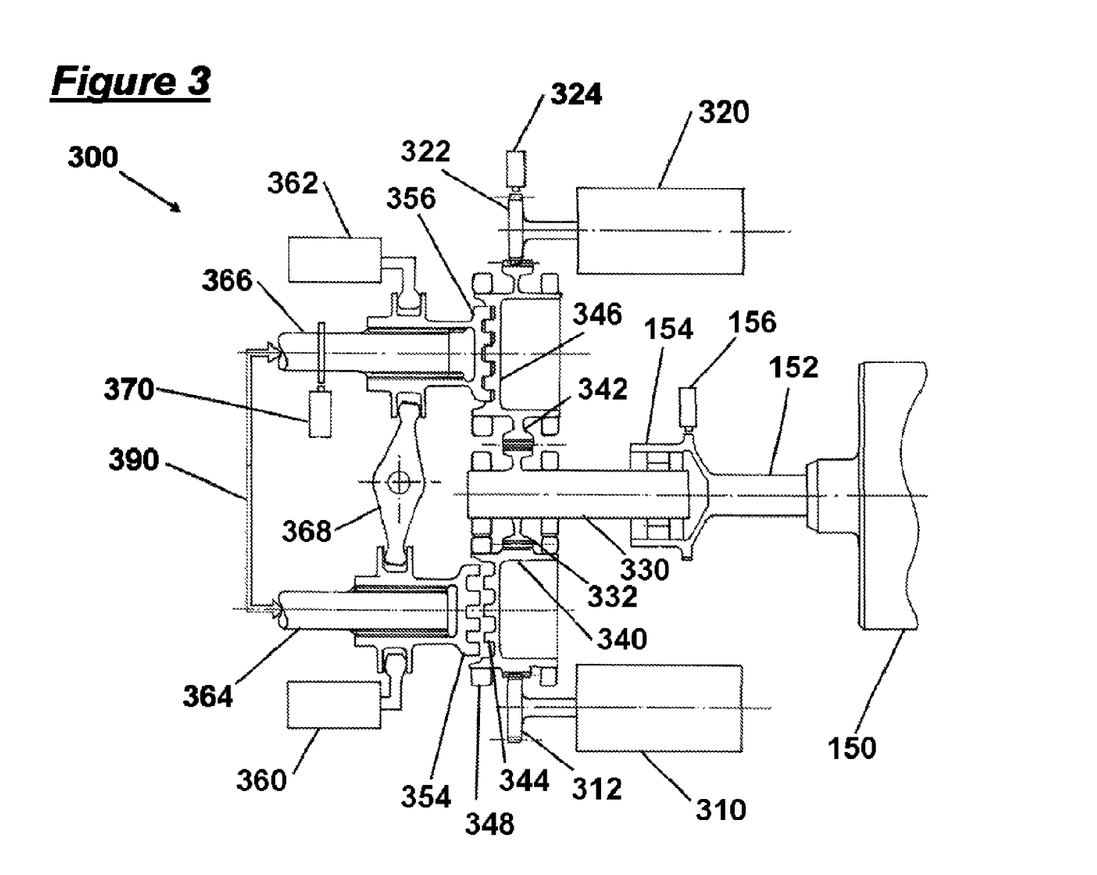
FIG. 3 is a schematic of the features of the multiple-output speed changer, the engine sprag clutch, the dog clutches and the generator/motors.

FIG. 3 is an enlarged schematic showing the features of a preferred multiple-output speed shifting gearbox 300. In this figure, a single engine 150 drives an engine shaft 152 coupled to a sprag clutch 154, whose over-running member 330 is integral with an output drive gear 332. The output drive gear 332 is co-meshed with a low-ratio gear 342 and high-ratio gear 340. In preferred embodiments, gears are mounted on bearings 348.

A first motor/generator 310, referred to simply as a generator 310 is coupled to a first connection gear 312 which meshes with the high-ratio gear 340. The high-ratio gear 340 is connected to a first driving element 344 of a first dog clutch. Similarly, the low-ratio gear 342 is also connected to a second driving element 346 of a second dog clutch. The first dog clutch comprises a first driving element 344 and a first driven element 354. Likewise, the second dog clutch comprises a second driving element 346 and a second driven element 356. The low-ratio gear 342 has a number of teeth which is different from the number of teeth of the high-ratio gear 340.

In FIG. 3, the second dog clutch, comprising second driving element 346 and a second driven element 356, is shown in engagement with the low-ratio gear 342. Engagement of the driving element 346 of the dog clutch is via an actuator 362 connected to a power source and controller. By contrast, the first dog clutch driven element 354 is shown out of engagement with the dog clutch driving element 344 and high-ratio gear 340 and is axially actuated by actuator 360. The dog clutch driven element 356 is axially slidable on output shaft 366, and dog clutch driven element 354 is axially slidable on output shaft 364. Both shafts 364, 366 are engaged with rotor reduction gearbox 140 generally via a connection 390.

It is contemplated that engine speed can be detected by any suitable means, including for example an engine speed sensor 156, while intermediate gear train and generator speed is detected by a generator speed sensor 324. In this or other ways, rotational speeds of each of the driven and driving elements of each of the dog clutches can be sensed and compared.

The reduction gearbox speed, which is a ratio rotor speed, is detected by an output speed sensor 370. A relay lever 368 is advantageously coupled to dog clutch driven members 364, 366 and serves two functions. The relay lever 368 acts as a mechanical interlock that prevents simultaneous engagement of the dog clutches, and allows either one of two actuators 360, 362 to perform the dog clutch movement function. The speed changing gearbox 300, being shown as a two-speed, has three states of dog clutch position and two states of drive. The low ratio gear, illustrated in engagement, has a higher output speed suitable for helicopter operation and the high ratio gear, when engaged, has the lower output speed suitable for cruise operation. The third state is a neutral condition when neither dog clutch is engaged, and no power is transmitted from the engine to the rotor. If configured as a three-speed gearbox, there could be four states of dog clutch position and three states of drive.

Electrical control systems, motors, and actuators and are well known in the field to be capable of high frequency operation. Such high frequency operation is useful when a speed synchronization event occurs rapidly, as in contemplated gearboxes of rotorcraft. As used herein in this context, the term "operating frequency" means the inverse of cycle time between detection of speed difference and issuing a command. It is contemplated that such actuators can be controlled within fractions of a millisecond, certainly in the range of 0.0001 to 0.1 seconds. This corresponds with an operating frequency range of 10 to 10,000 Hertz.

In preferred embodiments, rotational speed information can be collected from a number of sources, including for example the engines, the generator/motors and the rotor whilst clutch state or position information is gained from the clutch positioning actuators and from the physical location of the clutches. Such a plurality of speed and position information sources insure that a primary and a back-up system of effecting a ratio change can be used.

The rotor drive outputs referred to above are individually but sequentially clutched to the remainder of the drive system connected to the rotor. The clutch type selected is generally described as a dog clutch, one per output gear. A more application-specific type of coupling is a Curvic™ coupling. This is not a friction clutch, and benefits from accurate speed synchronization as described herein. Sequential operation is described as the state when only one of the dog clutches is engaged at any one time. Dual engagement is preferably prevented by a mechanical interlock system. Dual disengagement is preferably permitted and represents a "neutral" condition when neither the high nor low speed gears are engaged. In such a condition, engine power is not transmitted to the rotor.

Turboshaft aircraft engines are known in the field to be capable of operation at very low load or no load, such a condition is usually known as flight idle. Typical rotors might have output speeds in the range of 30 to 2,000 revolutions per minute. All appropriate rotational speeds are contemplated, for example, typical engines might have maximum output rotational speeds in the range of 1,000 to 50,000 revolutions per minute, while typical rotors might have maximum output speeds in the range of 30 to 2,000 revolutions per minute.

Figure 4:
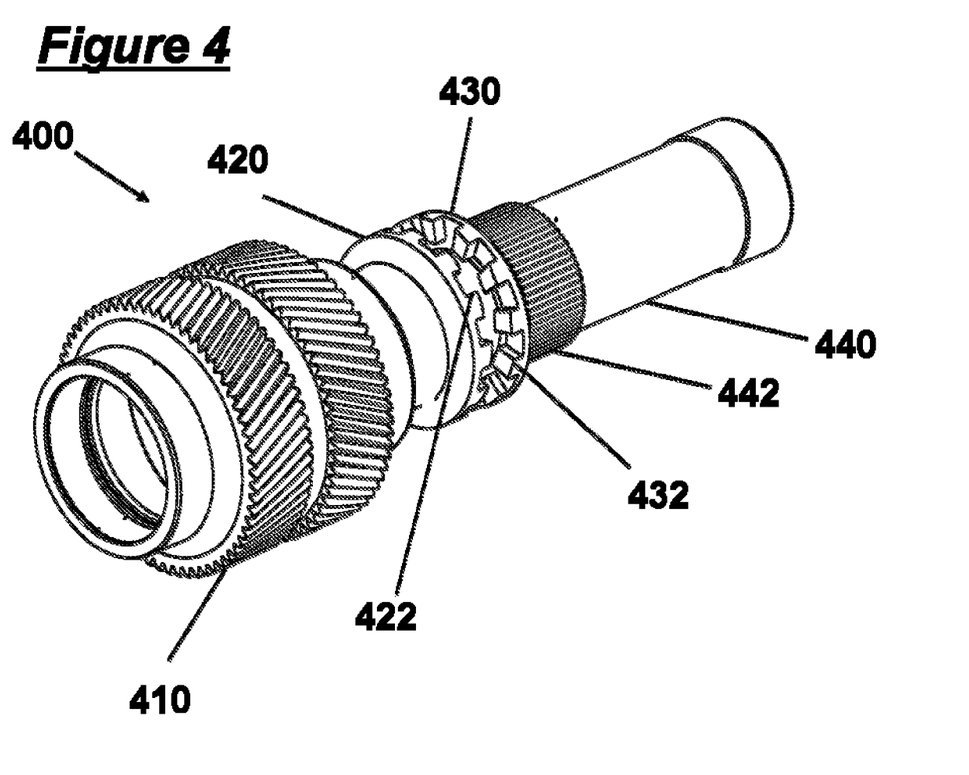
FIG. 4 is a perspective illustration of a disengaged dog clutch.

FIG. 4 is an illustration of a preferred dog clutch 400 in the disengaged mode. A low-speed gear 410 is coupled to the driving element 420 of the dog clutch 400. The driving element 420 has a number of teeth 422. A driven element 430 of a dog clutch 400 is shown coupled to an output shaft 440 and spline 442. As drawn in FIG. 4, the teeth 422 of the driving element 420 of the dog clutch 400 are not in contact with teeth 432 of the driven element 430. This is referred to as the disengaged mode of the dog clutch 400.

Figure 5:
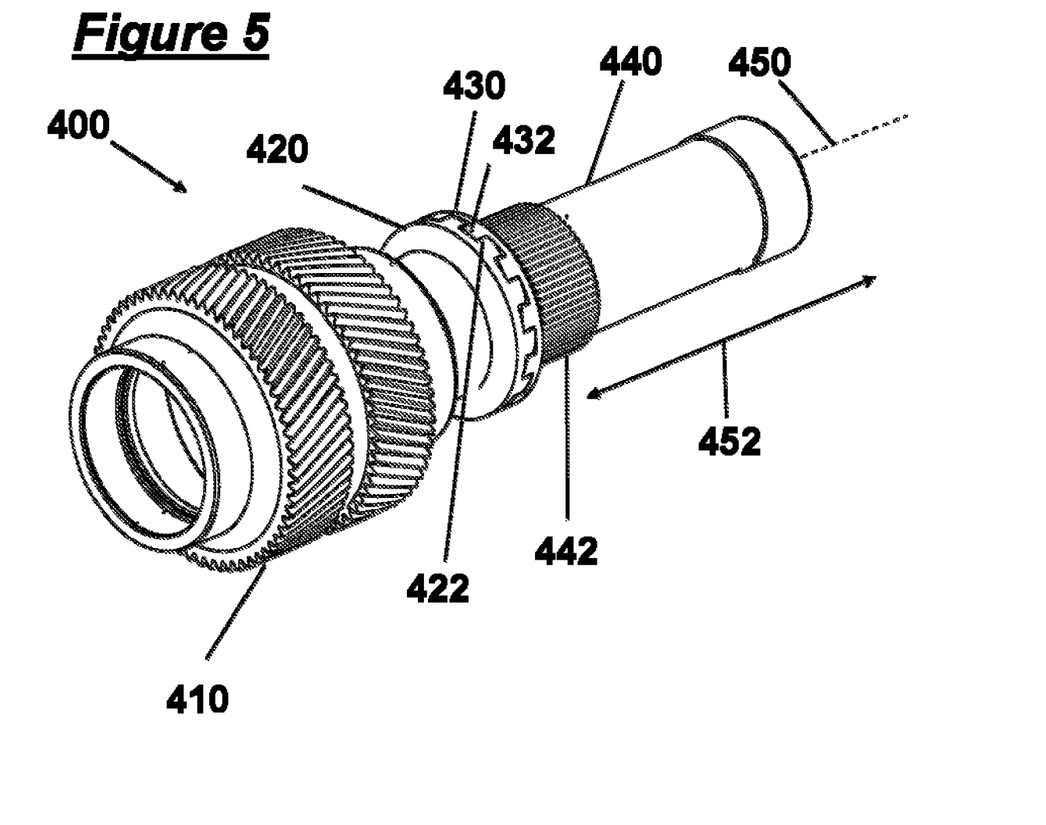
FIG. 5 is a perspective illustration of the dog clutch of FIG. 4, here shown in the engaged mode.

FIG. 5 is an illustration of the same preferred dog clutch 400 in the engaged mode. The driven element 430 of the dog clutch 400 slides axially parallel to the axis of rotation 450 in the manner shown by arrow 452 to the engaged mode. In the engaged mode, it can be seen that a tooth 422 on the driving element 420 of the dog clutch 400 is in contact with a tooth 432 on the driven element 430. Furthermore, the tooth preferably has a curved profile to facilitate smooth engagement even with a small rotational speed mismatch of 0 to 2 percent. The driving element 420 and the driven element 430 of the dog clutch 400 are speed synchronized to allow engagement.

In preferred embodiments, the speed synchronizing is accomplished by adjusting output shaft 440 speed via a rotor brake or blade pitch adjustment and also adjusting input gear 410 speed via electrical generator load change. These speed adjustment methods use motive sources controlled by electrical control system and facilitate accelerate of at least one of the driving and driven elements to engage the other. In preferred embodiments, the rotational speeds can be matched within 0 to 1 percent. Especially preferred control systems operate upon a low inertia (driving element side) high response rate loop comprising a motor driving the driving element. It is further contemplated that engine speed and torque can be accurately electronically controlled within a reasonable range. Modern Full-Authority Digital Engine Control (FADEC) systems capable of this are known in the industry. Engine speed can be controlled within a range, including for example 50-100% of a nominal engine rotational speed, and engine speed can be controlled to allow selective over-running of a sprag clutch.

Figure 6:
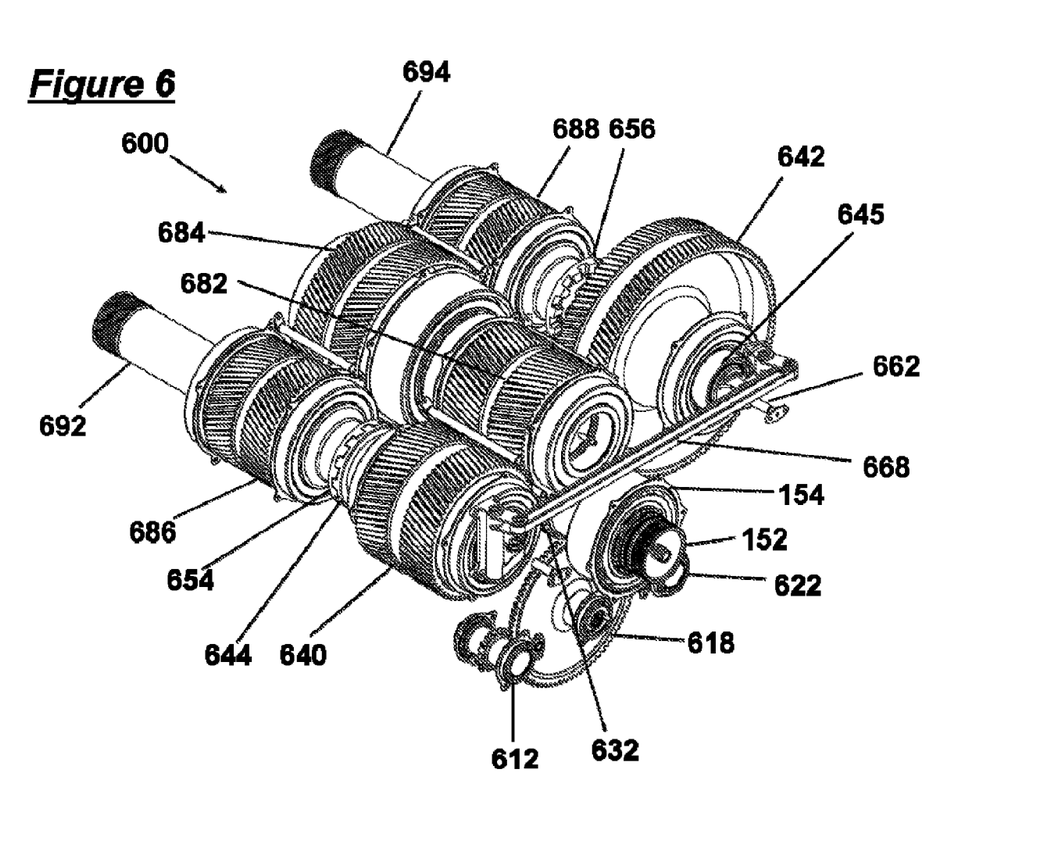
FIG. 6 is a perspective illustration of a preferred shifting gearbox.

FIG. 6 is an isometric (perspective) illustration of an alternate preferred shifting gearbox 600 of a rotorcraft An engine input shaft 152 is coupled to a sprag clutch 154, the over-running end of which is connected to a input distribution gear 632 driving a transfer gear 682 in mesh with both a high-speed gear 640 used primarily for helicopter mode and a low-speed gear 642 used primarily for cruise mode. The input distribution gear 632 is also in mesh with an accessory gear 618 driving an oil pump (not shown) for lubrication and cooling, and coupled to a first and second electrical power generator gear 612, 622. The high-speed gear 640 is connected to a driving element 644 of a first dog clutch, shown engaged with a driven element 654 coupled with a first output gear 686. By contrast, the low-speed gear 642 is coupled shown disengaged with a driven element 656 of a second dog clutch. The driven element 656 is coupled to a second output gear 686. Both the driving 644 and driven 640 elements are seen to be intermediate components of the gearbox 600. An output sharing gear 684 is in mesh with both first and second output gears 686, 688, and allows power to be transferred to first and second output shafts 692, 694. The second driving element of the second dog clutch (not shown) is on a shaft 645 axially moved by an actuator 662. A relay lever assembly 668 mechanically inhibits engagement of first and second dog clutches simultaneously. One skilled in the art will appreciate that the shifting gearbox 600 allows for speed changing without reliance on any frictional coupling or frictional clutch.

Figure 7:
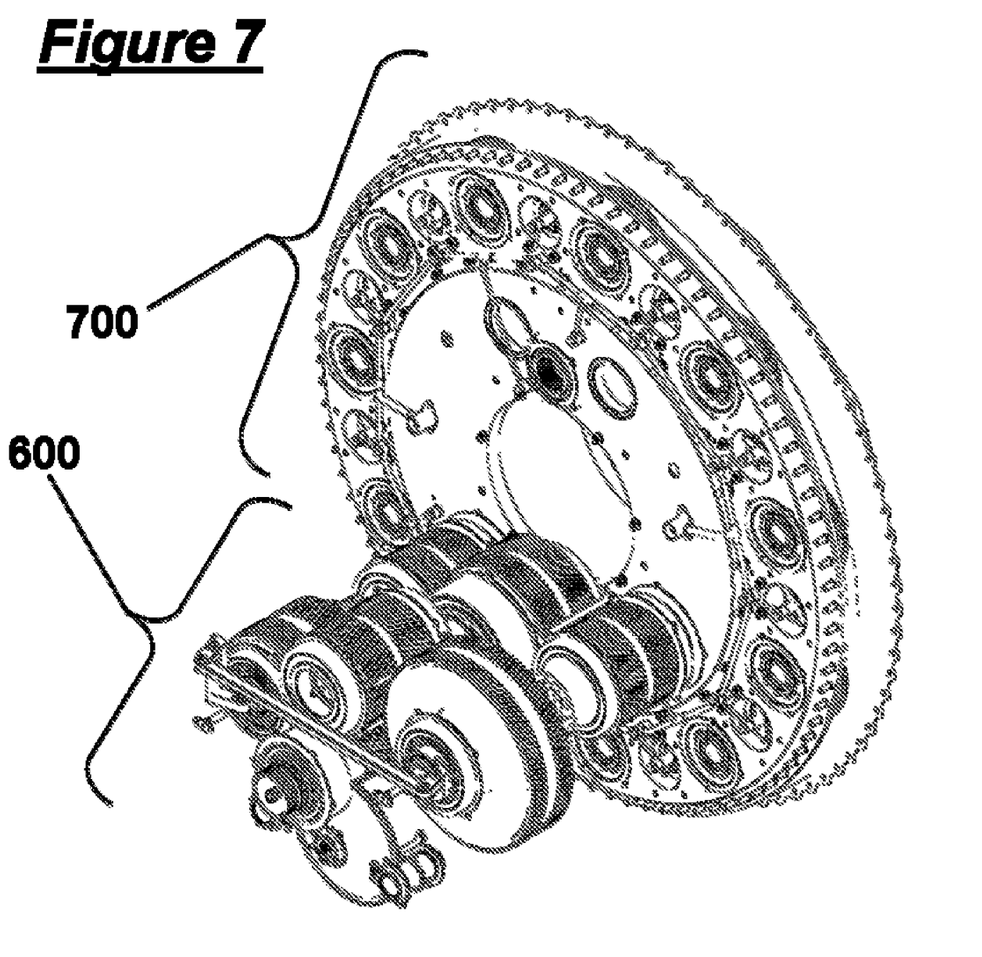
FIG. 7 is a perspective illustration of a preferred assembly of a shifting gearbox and reduction gearbox.

FIG. 7 depicts a preferred arrangement of a shifting gearbox 600 coupled to a reduction gearbox 700 following the teachings of U.S. provisional patent Ser. No. 61/034,462 referenced above.

Both rotors are preferably mechanically interconnected by a cross-wing driveshaft. It is contemplated that speed changing events, comprising de-clutching, engine speed adjustment and re-clutching, could take place sequentially. One nacelle's shifting gearbox will affect a change in speeds, followed be a speed-change event on the opposite nacelle. Thus, the engine or engines disposed in one nacelle or on one side of the aircraft will operate both rotors. Viewed in another manner, it could be said that all rotors are under continuous power. Additional redundancy is therefore provided such that if one speed-changing gearbox fails to engage or drive, both rotors are continuously driven from the unaffected nacelle drive system.

Any suitable control system may be used for control of input and output side speeds and loads. Electronic control systems are well known in the industry, and could be easily adapted to suit desired applications in the present inventive subject matter. Similarly, any number of shifting sequences are contemplated. Systems as described are capable of shifting either up or down in output speed ratios.

Figure 8:
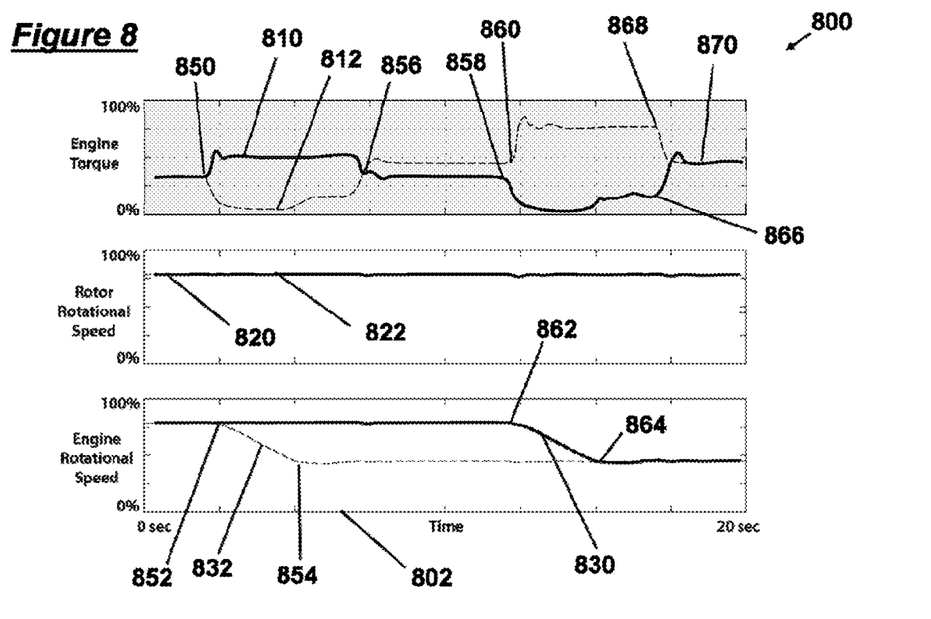
FIG. 8 is a plot of a preferred shifting sequence time history.

One preferred notional shifting sequence 800 of a two-engine tiltrotor from cruise mode gear to helicopter mode gear (thus reducing engine speed for constant rotor speed) is described schematically in FIG. 8. The output torque of the right engine is plotted as a dark line 810, and the output torque of the left engine is plotted as a light line 812 against a common time axis 802. Similarly, the right rotor rotational speed is plotted as a dark line 820, and the left rotor rotational speed is plotted as a light line 812 against the same common time axis 802. It can be seen that the left and right rotor speeds 820, 822 remain essentially identical throughout the shifting sequence 800 because they are mechanically coupled by a cross-wing driveshaft. The output rotational speed of the right engine is plotted as a dark line 830, and the output rotational speed of the left engine is plotted as a light line 832 against the time axis 802.

The shifting sequence is initiated by a command 850 to reduce torque to the left engine, and reduce the left engine speed. The torque to the right engine 810 increases in order to maintain constant output power to the two rotors for steady flight. A short time later, the left engine speed reaches the desired reduced value 854. The torque of the left engine is then commanded to increase 856, resulting in the left engine outputting more torque than the right engine because of the engine rotational speed differential. The output torque of the right engine is then commanded to decrease 858 at the same time the speed of the right engine is commanded to decrease 862. The output torque of the left engine increases 860 to maintain constant output power to the rotors. A short time later, the right engine achieves the desired reduced engine speed 864. The torque of the two engines is then equalized 866, 868 completing the shifting process. These methods enable quick shifting of an aircraft from one gear to another, with contemplated times in the range of 6 to 50 seconds to complete a gear shift.

Figure 9:
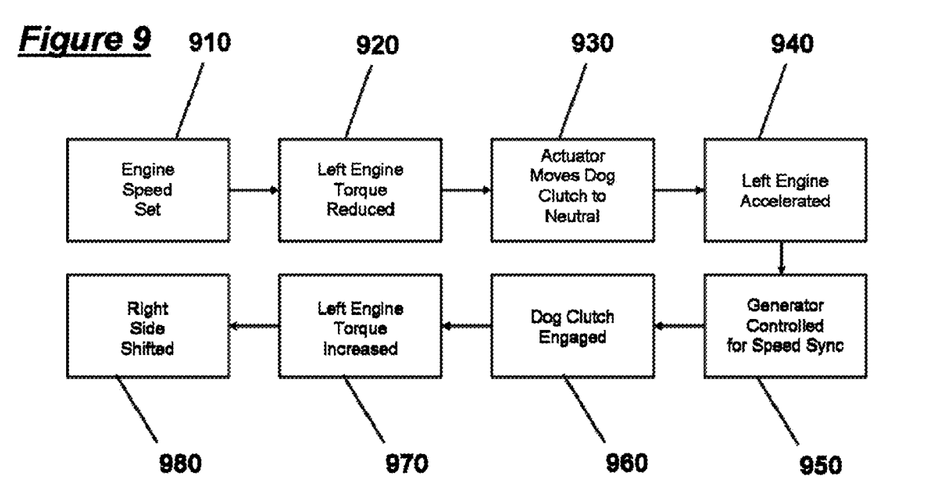
FIG. 9 is a schematic of a flowchart of another preferred shifting sequence.

Viewed from another perspective, a second notional preferred shifting process can be described by the flowchart in FIG. 9, which is a schematic of the sequence of events when the left nacelle is the first to receive a gear change command, and the instruction is to raise the speed of the rotors as required for a transition from cruise to helicopter mode flight. In this example, the gear ratio step or shifting factor is 1.5.

In step 910, both engines are set to a speed to just below 66% of rated speed, at a power setting commensurate with the flight conditions and the engine's output characteristics.

Subsequently, in step 920, the left engine 150 is reduced to a near-zero torque (a flight idle condition) whereby the engine sprag clutch 154 is in an output over-run condition and the high ratio dog clutch driven element 354 is relieved of torque.

In step 930, the actuator 360 displaces dog clutch driven element 354 from engaged position to neutral. Then, in step 940, the engine 150 is preferably accelerated with low load to a speed 1 or 2% below the speed required for exact gear synchronization between dog clutch driven element 356 and low ratio gear 342 as computed by an engine controller and a rotor pitch controller using speed sensing signals derived from sensor 156 for the engine and 370 for the rotor.

At substantially the same time, in step 950, a motive source, including for example a motor/generator 320 is powered and controlled and accelerated until there is a close synchronization between dog driven element 356 and dog clutch driving element 346. As used herein, when the rotational speed of elements "closely match" means within that the lesser of the two speeds is within one percent of the greater of the two speeds. The control function preferably uses speed sensing signals derived from a sensor 324 for the electric motor and sensor 370 for the rotor.

In step 960, an actuator 362 is energized and engages the dog clutch driven element 356 into the driving element 346. Next, in step 970, the motor/generator 320 is powered down and the torque of engine 150 increased until the required torque balance is achieved between left and right tilting nacelles. This is an intermediate condition when the ratio of left to right engine speeds is at 1.5. Finally, in step 980, a similar gear shift sequence is initiated for the right engine and rotor 120, resulting in the right engine and accelerating to the appropriate speed, at which point the engine speeds are re-synchronized and the engines share load.

Thus, specific embodiments and applications of a speed synchronizing, speed changing, and shifting gearbox have been disclosed. It should be apparent, however, to those skilled in the art that many more modifications besides those already described are possible without departing from the inventive concepts herein. For example, the inventive concepts can be applied to myriad applications, especially where power systems must handle high inertias and high loads, and have a need for automatic control. Examples include gearboxes of four-rotor tiltrotors, helicopters, trucks, earthmoving equipment, tanks, and other heavy vehicles. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A method comprising:
   providing a first dog clutch having driven and driving elements, wherein the driving and driven elements are intermediate components of a gearbox of an aircraft;
   mechanically connecting the driving element of the first dog clutch to a first gear having a first number of teeth;
   sensing rotational speeds of each of the elements; and
   using an electrical control system to independently effect acceleration of both of the elements to engage each other without the use of a friction coupling.

2. The method of claim 1, further comprising a second dog clutch functionally coupled in parallel with the first dog clutch.

3. The method of claim 2, further comprising a mechanical interlock that prevents simultaneous engagement of the clutches.

4. The method of claim 2, further comprising coupling a driving element of the second dog clutch to a second gear having a second number of teeth different from the first number of teeth.

5. The method of claim 2, wherein the step of using an electrical control system comprises controlling at least two of a rotor, a brake, a generator, an electric motor, and a combustion motor.

6. The method of claim 2, further operatively using an electric motor and an overrunning clutch to overrun a portion of a drive train that includes the first and second dog clutches, relative to an engine.

7. The method of claim 1, wherein the control system operates upon a low inertia, high response rate loop comprising a motor driving the driving element.

8. The method of claim 1, wherein the system has an operating frequency of at least 1 Hertz.

9. The method of claim 1, wherein the system has an operating frequency of at least 10 Hertz.

10. The method of claim 1, further comprising providing a rotor blade that receives power through a drive train that includes the dog clutch, and using Individual Blade Control (IBC) to control the rotor blade.

11. The method of claim 10, further comprising utilizing high speed control to reduce rotational oscillation of the drive train.

12. The method of claim 1, further comprising employing a second control system that is redundant to the electrical control system.

13. A method comprising:
    providing a first dog clutch having driven and driving elements;
    mechanically connecting the driving element of the first dog clutch to a first gear having a first number of teeth;
    sensing rotational speeds of each of the elements;
    using an electrical control system to independently effect acceleration of both of the elements to engage each other without the use of a friction coupling; and
    further comprising providing a rotor blade that receives power through a drive train that includes the dog clutch, and using Individual Blade Control (IBC) to control the rotor blade.

14. The method of claim 13, further comprising utilizing high speed control to reduce rotational oscillation of the drive train.

\* \* \* \* \*